(12) United States Patent
Matsuo

(10) Patent No.: US 7,977,616 B2
(45) Date of Patent: Jul. 12, 2011

(54) MICROSCOPE EQUIPPED WITH AUTOMATIC FOCUSING MECHANISM AND ADJUSTMENT METHOD THEREOF

(75) Inventor: Yuichiro Matsuo, Hachioji (JP)

(73) Assignee: Olympus Corporation, Tokyo (JP)

( * ) Notice: Subject to any disclaimer, the term of this patent is extended or adjusted under 35 U.S.C. 154(b) by 392 days.

(21) Appl. No.: 12/160,546

(22) PCT Filed: Jan. 12, 2007

(86) PCT No.: PCT/JP2007/050301
§ 371 (c)(1),
(2), (4) Date: Jul. 10, 2008

(87) PCT Pub. No.: WO2007/080952
PCT Pub. Date: Jul. 19, 2007

(65) Prior Publication Data
US 2010/0001171 A1    Jan. 7, 2010

(30) Foreign Application Priority Data

Jan. 12, 2006  (JP) .................... 2006-004880

(51) Int. Cl.
*G02B 27/40* (2006.01)
*G02B 7/04* (2006.01)
(52) U.S. Cl. ............... 250/201.2; 250/201.3; 250/201.4; 359/368
(58) Field of Classification Search ............... 250/208.1, 250/204, 306, 308, 201.7, 201.2–201.4; 359/368
See application file for complete search history.

(56) References Cited

U.S. PATENT DOCUMENTS

| | | | | |
|---|---|---|---|---|
| 5,530,237 A | * | 6/1996 | Sato et al. .................. | 250/201.4 |
| 5,892,622 A | * | 4/1999 | Abe ............................. | 359/618 |
| 6,111,647 A | * | 8/2000 | Ogura et al. .................. | 356/615 |
| 6,974,938 B1 | | 12/2005 | Leblans et al. | |
| 2003/0142398 A1 | | 7/2003 | Leblans | |
| 2004/0113043 A1 | | 6/2004 | Ishikawa et al. | |

FOREIGN PATENT DOCUMENTS

JP        04-310909       11/1992

(Continued)

OTHER PUBLICATIONS

International Search Report from corresponding PCT application, dated Feb. 20, 2007, 2 pp.

(Continued)

*Primary Examiner* — Tony Ko
(74) *Attorney, Agent, or Firm* — Pillsbury Winthrop Shaw Pittman, LLP

(57) ABSTRACT

Provided is a microscope equipped with an automatic focusing mechanism, comprising an illumination light source; an objective lens for focusing first light emitted from the illumination light source onto an object to be detected; an illumination light source for imaging the first light that is reflected by the object to be detected and passes through the objective lens; and a focal-point detector for detecting a positional shift of a microtiter plate from a focal position of the objective lens, wherein the focal-point detector includes a focal-point-detection light source for emitting focal-point-detection light serving as second light, a focal-point detection light acquisition unit on which the focal-point-detection light is focused, and a region setting unit which can set an in-focus assessable region of the focal-point-detection light acquired by the focal-point detection light acquisition unit to any position on the focal-point detection light acquisition unit.

2 Claims, 9 Drawing Sheets

FOREIGN PATENT DOCUMENTS

| | | |
|---|---|---|
| JP | 08234093 | 9/1996 |
| JP | 10133117 | 5/1998 |
| JP | 2003-185914 | 7/2003 |
| JP | 2003526814 | 9/2003 |

OTHER PUBLICATIONS

European Search Report dated Dec. 7, 2010.
Japanese Office Action dated Feb. 23, 2011.

* cited by examiner

MICROSCOPE EQUIPPED WITH AUTOMATIC FOCUSING MECHANISM AND ADJUSTMENT METHOD THEREOF This is the U.S. National Stage of International Application No. PCT/JP2007/050301, filed on Jan. 12, 2007, which, in turn, relies for priority upon Japanese Patent Application No. 2006-004880, filed on Jan. 12, 2006, the contents of both of which are incorporated herein by reference in their entireties.

TECHNICAL FIELD

The present invention relates to a focal-point detection device of a microscope used, for example, in a cell screening apparatus, and also relates to an adjustment method for such a focal-point detection device.

BACKGROUND ART

As background art, Japanese Unexamined Patent Application, Publication No. HEI-10-133117 discloses a microscope equipped with a focal-point detection method, the so-called lateral shift method, in which a fixed pattern is projected onto an object to be detected, and a light beam forming an image of this pattern becomes asymmetric with respect to the optical axis in the vicinity of the pupil, so as to detect a variation in the gap between the object to be detected and an objective lens as a lateral shift of the pattern image.
[Patent Document 1]
Japanese Unexamined Patent Application, Publication No. HEI-10-133117.

DISCLOSURE OF INVENTION

In Japanese Unexamined Patent Application, Publication No. HEI-10-133117, a two-element detector is used for detecting the focal-point detection light, the output of each sensor passes through a differential detector, and the position where the output thereof is zero determines the focal position. To correctly detect this state, the center of the minute spot must be precisely projected on the dividing line of the sensors of the two-element detector. If this is not the case, the outputs of the sensors will not be equal, and therefore, the wrong position will be determined as the focal point. Accordingly, in the adjustment procedure when assembling this focal-point detection mechanism, it is necessary to perform positioning of the two-element detector by checking each sensor output while changing the sensor position on sub-millimeter order. This procedure requires substantial effort and time, resulting in the problem of increased fabrication costs.

An object of the present invention is to provide a microscope, equipped with an automatic focusing mechanism, which can substantially reduce the time and effort required for adjusting the automatic focusing mechanism, as well as an adjustment method therefor.

To solve the problems described above, the present invention provides a microscope equipped with an automatic focusing mechanism as follows, as well as an adjustment method therefor.

A first aspect of the present invention is a microscope equipped with an automatic focusing mechanism, comprising an observation light source; an objective lens for focusing first light emitted from the observation light source on an object to be detected; an observation optical system for imaging the first light which is reflected by the object to be detected and passes through the objective lens; and a focal-point detector for detecting a positional shift of the object to be detected from a focal position of the objective lens, wherein the focal-point detector includes a focal-point detection light source for emitting focal-point detection light serving as second light, a focal-point detection light acquisition unit on which is focused the focal-point detection light that is emitted from the focal-point detection light source, that is focused on the object to be detected via the objective lens, and that returns via the objective lens upon reflection at the object to be detected, and a region setting unit which can set an in-focus assessable region of the focal-point detection light acquired by the focal-point detection light acquisition unit to any position on the focal-point detection light acquisition unit.

With this aspect, it is possible to assess the in-focus state of the focal-point detection light at any position on the focal-point detection light acquisition unit. Therefore, it is possible to easily perform adjustment compared with the conventional method involving use of a two-element detector to perform positional adjustment of a minute spot, which requires a substantial amount of time and effort during assembly.

More specifically, during adjustment, the position of the focal-point detection light focused on the focal-point detection light acquisition unit is stored as an in-focus assessable region, and during the automatic focal-point detection operation, the in-focus state of the focal-point detection light at the stored position is assessed.

During adjustment, the region setting unit may divide the focal-point detection light acquisition unit into at least two data regions centered on the focal-point detection light focused on the focal-point detection light acquisition unit, and during an automatic focal-point detection operation, may assess an in-focus state of the focal-point detection light on the basis of brightnesses of the focal-point detection light focused in the divided data regions.

With the objective lens positioned at the in-focus state, the focal-point detection light emitted from the focal-point detection light source is also focused at the object to be detected, and the reflected light thereof is focused as a minute spot on the focal-point detection light acquisition unit. The region setting unit divides the data region of the focal-point detection light acquisition unit into at least two parts, with this spot serving as the boundary. The region setting unit stores the divided data regions, and during actual use, the in-focus state of the objective lens is determined on the basis of a change in the brightness value of the focal-point detection light in each data region.

The focal-point detection light acquisition unit can be an area sensor. Additionally, the object to be detected can be a microtiter plate.

A second aspect of the present invention is an adjustment method for a microscope equipped with an automatic focusing mechanism, comprising positioning the object to be detected at the focal position of the objective lens; then dividing the data region of the focal-position detection light acquisition unit into at least two parts centered on the focal-point detection light focused on the focal-point detection light acquisition unit; assessing an in-focus state of the objective lens on the basis of a brightness value of the focal-point detection light in each divided data region during a subsequent automatic focal-point detection operation; and moving the objective lens to an in-focus position on the basis of the assessment result.

During adjustment of the automatic focusing mechanism, first, the user positions the objective lens in the in-focus state by visual observation. In this state, the focal-point detection light emitted from the focal-point detection light source is also focused at the object to be detected, and the reflected light thereof is focused as a minute spot on the focal-point detection light acquisition unit. The data region of the focal-point detection light acquisition unit is divided into at least two parts, with this spot serving as the boundary. By storing the divided data regions, during actual use, it is possible to determine the in-focus state of the objective lens on the basis of the brightness value of the focal-point detection light in each data region.

With the present invention, it is possible to easily perform positional adjustment of the focal-point detection light acquisition unit with a region setting unit that can arbitrarily set a focal-point detection light detection area on the focal-point detection light acquisition unit, thus allowing a substantial reduction in the time and effort required for adjustment.

EXPLANATION OF REFERENCE SIGNS

1A Observation optical system
1C Focal-point detector (autofocus optical system)
2 Objective lens
9 Illumination light source (observation light source)
12 Microtiter plate (object to be detected)
13 Laser diode (focal-point detection light source)
18 Focal-point detection light acquisition unit (arrayed detector, CCD)
19, 19A Focal-point detection calculation unit (region setting unit)

BEST MODE FOR CARRYING OUT THE INVENTION

First Embodiment

Using the drawings, a microscope according to a first embodiment of the present invention will be described below with reference to FIGS. 1 to 9.

Figure 1:
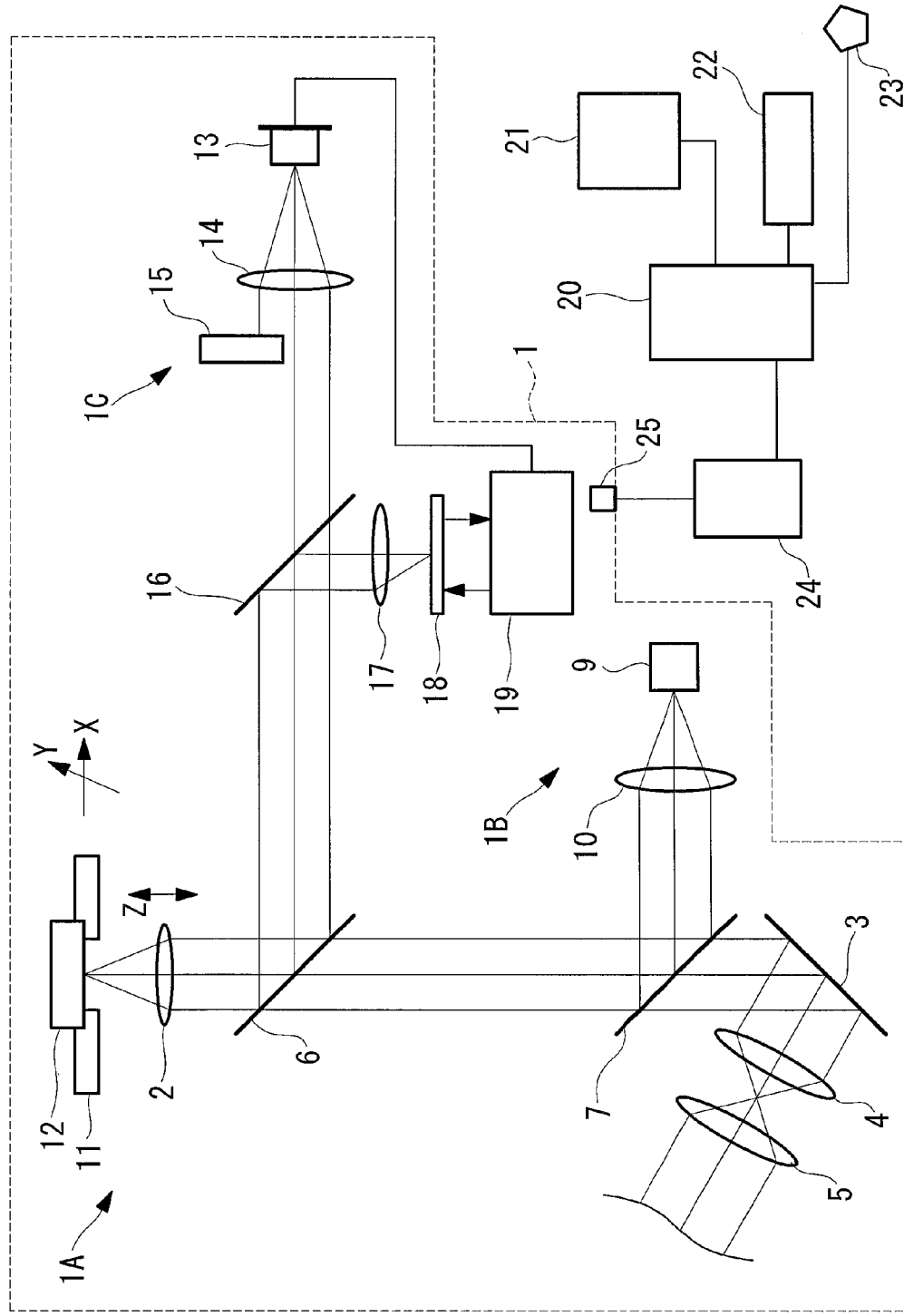
FIG. 1 is a diagram showing the configuration of a microscope according to a first embodiment of the present invention.

FIG. 1 is a diagram showing an inverted microscope according to this embodiment (a microscope equipped with an automatic focusing mechanism). Reference sign 1 is an inverted microscope main body. An optical system of the inverted microscope main body 1 in FIG. 1 is formed of an observation optical system 1A, an illumination optical system 1B, and an autofocus optical system (focal-point detector) 1C.

The observation optical system 1A includes an objective lens 2, a reflecting mirror 3, and intermediate optical systems 4 and 5, and an image-forming optical system (not shown) that includes an eyepiece lens is provided at the end of the intermediate optical systems 4 and 5.

A collimated light path is formed between the objective lens 2 and the reflecting mirror 3, and a dichroic mirror 6 and a half-mirror 7 are disposed in this collimated light path at an angle of 45° with respect to the optical axis of the light path.

The illumination optical system 1B includes an illumination light source (observation light source) 9, for example, a metal halide lamp, for emitting visible light (first light) and a collimator lens 10.

The illumination beam is reflected by the half-mirror 7 and is guided to the collimated light path between the objective lens 2 and the reflecting mirror 3. Thus, samples (for example, cells) disposed inside a microtiter plate (object to be detected) 12 on an XY motorized stage 11 are irradiated.

The autofocus optical system 1C includes a laser diode (focal-point detection light source) 13 for emitting 785 nm infrared light serving as focal-point detection light, a collimator lens 14, a light-blocking plate 15, a half-mirror 16, a focusing lens 17, an array detector (focal-point detection light acquisition unit) 18, and a focal-point detection calculation unit (region setting unit) 19. The array detector 18 in this embodiment is a CCD area sensor which is sensitive in the infrared region, with an effective number of pixels of about 1,500,000, and the size of each pixel is 4.65 μm×4.65 μm square. Hereinafter, the array detector 18 is referred to as CCD 18.

A control box 24 and a computer 20 are connected to the microscope 1 via a connector 25, and the microscope 1 is controlled by an operator operating the computer 20, a monitor 21, a keyboard 22, and a mouse 23. The computer 20 and the control box 24 are connected by RS-232C. The control box 24 drives the objective lens 2, the illumination light source 9, the XY stage 11, and the focal-point detection calculation unit 19 of the microscope 1 upon receiving commands from the computer 20, and simultaneously plays the role of ascertaining the operating state of each unit and sending it to the computer 20.

Figure 2:
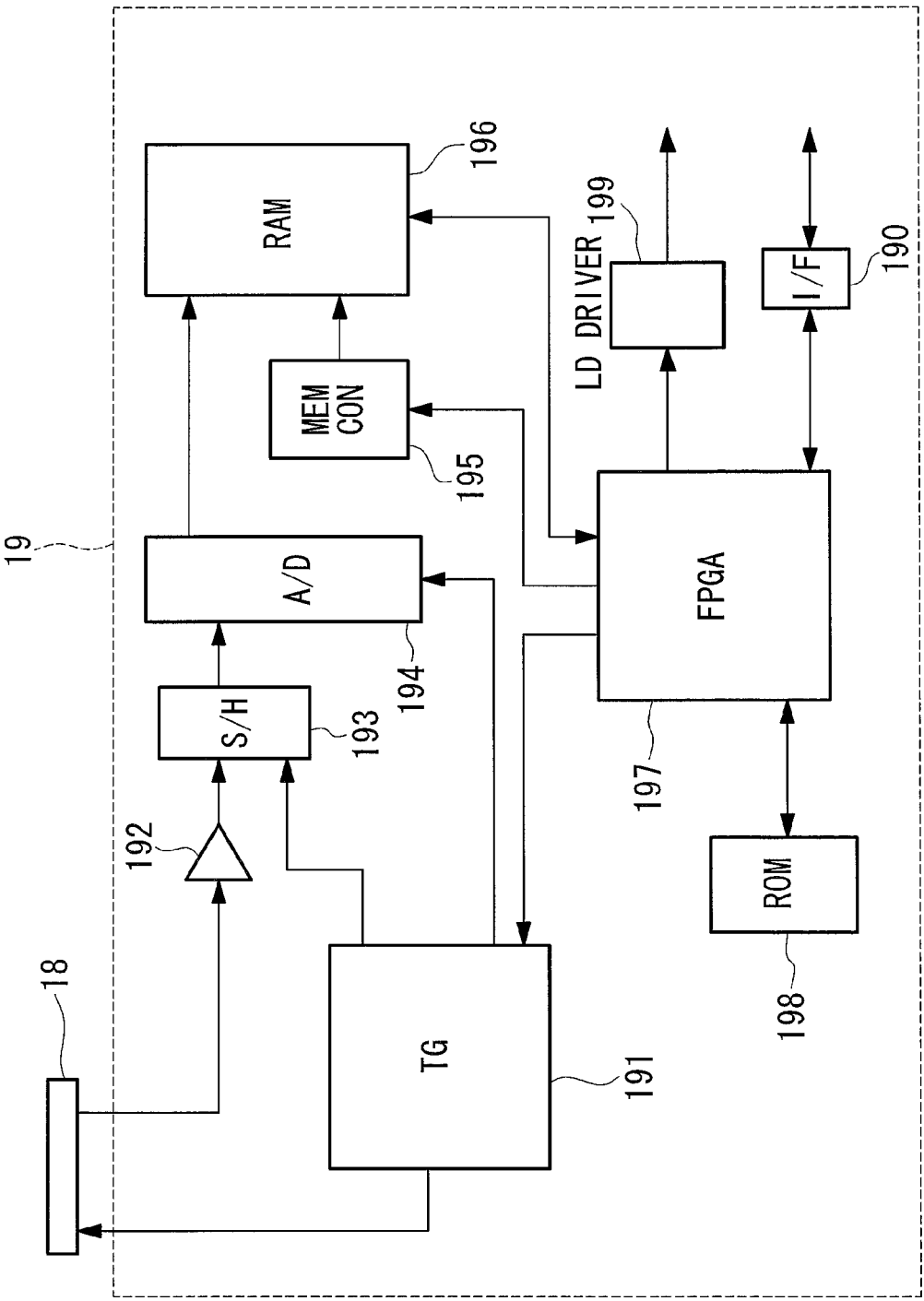
FIG. 2 is a block diagram showing a focal-point detection calculation unit of the microscope in FIG. 1.

The focal-point detection calculation unit 19 is configured as shown in FIG. 2. TG 191 is a timing generator which outputs driving pulses to the CCD 18 for driving the CCD 18. The output signal of each pixel output from the CCD 18 is sampled in a sample-and-hold circuit 193, via a buffer amplifier 192.

A signal required for sampling and holding in this sample-and-hold circuit 193 is supplied from the TG 191. The sampled output signal from the CCD 18 is converted to digital data at an A/D converter 194. A conversion clock signal from the TG 191 is used in the digital data conversion in the A/D converter 194.

The digital data output from the A/D converter 194 is transferred to a RAM 196, which has a capacity allowing it to store the digital data for all pixels of the CCD 18. For the RAM 196, write timing and write addresses are specified by a memory controller 195. The memory controller 195 receives an operation control signal from an FPGA 197 and operates on the basis thereof. The FPGA 197 gives an output instruction for the driving signal of the CCD 18 to the TG 191, gives an operation instruction to the memory controller 195, and performs analysis computations on the photoreceptor data at the CCD 18 surface, which is written in the RAM 196, to determine whether or not the system is in focus.

Then, to move the objective lens 2 up or down, an instruction is output to the control box 24 via an interface 190. The FPGA 197 performs control for turning the laser diode 13 ON/OFF via an LD driver 199. Addresses indicating the computed region on the CCD 18 surface, for performing in-focus analysis computations (described in detail later), are written in a ROM 198. The FPGA 197 reads out the data in the ROM 198 and, on the basis of this data, performs analysis computations on the data at the CCD 18 surface, which is written in the RAM 196.

Details of the actual operation of the microscope of this embodiment, configured as above, will now be described. The following describes:
(1) an adjustment procedure for enabling an automatic focal-point detection operation to be performed; and
(2) an operation for performing automatic focal-point detection when observing an object to be detected using the adjusted microscope.

(1) Adjustment Procedure for Enabling the Automatic Focal-Point Detection Operation to be Performed First, the adjustment method for enabling the automatic focal-point detection operation with the CCD 18 of the microscope 1 used in this embodiment will be described.

The person performing adjustment turns on the power to the microscope 1, the control box 24, the computer 20, and the monitor 21 to initialize the system, and launches an adjustment program on the computer 20. Then, he or she places the microtiter plate 12 on the XY stage 11 and operates the computer 20 to move the XY stage 11 to place a desired well of the microtiter plate 12 in the field of view of the objective lens 2. An optical image of the microtiter plate 12 can be observed with an eyepiece lens or the CCD camera installed on the camera port, allowing the current focus state to be visually confirmed.

The person performing adjustment then operates the computer 20 to turn on the laser diode 13 and the focal-point detection calculation unit 19. By doing so, infrared light is emitted from the laser diode 13, is reflected at the microtiter plate 12, and is focused onto the CCD 18 via the half mirror 16 and the focusing lens 17. Because the image-acquisition area of the CCD 18 is displayed on the screen on the monitor 21, it is possible to confirm the state of the infrared light on the CCD 18.

Next, the person performing adjustment operates the computer 20 to move the objective lens 2 up and down (in the Z direction) to focus at a plane on the objective lens 2 side of the bottom surface of the microtiter plate 12 while checking the image acquired via the eyepiece lens or the CCD 18. At this time, the infrared light emitted from the laser diode 13 is also focused at the plane on the objective lens 2 side of the bottom surface of the microtiter plate 12 by the objective lens 2, and the reflected light thereof is reflected at the dichroic mirror 6 and focused as a minute spot on the CCD 18, via the half-mirror 16 and the focusing lens 17.

Figure 3:
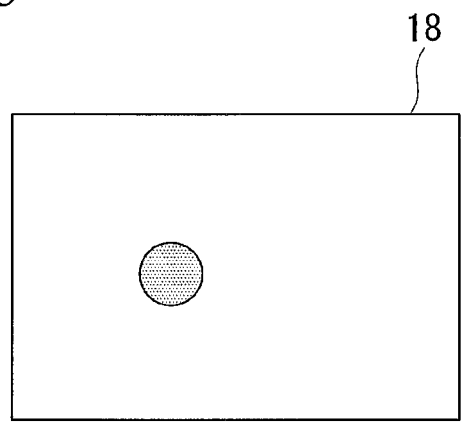
FIG. 3 is a diagram showing a minute spot focused on a CCD.
Figure 4:
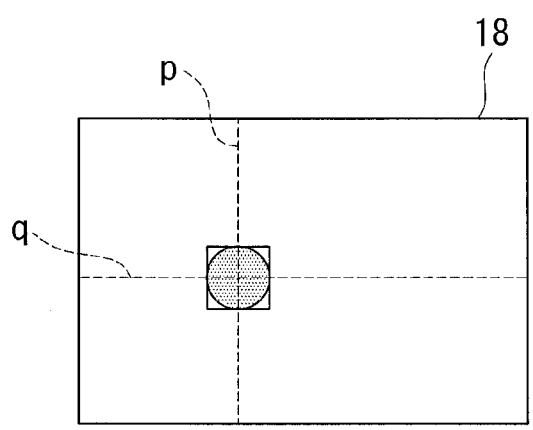
FIG. 4 is a diagram showing a minute spot focused on a CCD.

This is shown in FIG. 3. A similar image is also displayed on the monitor 21. The in-focus minute spot is focused at a position slightly to the left from the center of the CCD 18 surface. Then, the person performing adjustment issues a dividing-line detection instruction from the computer 20. By doing so, the FPGA 197 of the focal-point detection calculation unit 19 performs analysis computational processing to determine where the spot exists on the surface of the CCD 18, from the data written in the RAM 196. When the spot is identified by the FPGA 197, the FPGA 197 surrounds the spot with a rectangle, as shown in FIG. 4, finds the center of that rectangle, calculates vertical and horizontal dividing lines for the CCD 18 surface, and stores the pixel address on the CCD 18 surface for those lines in the ROM 198.

Figure 5:
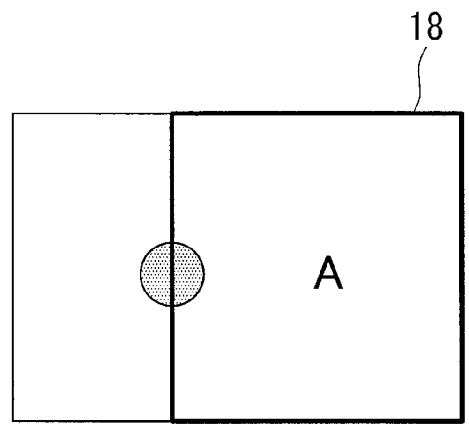
FIG. 5 is a diagram showing a minute spot focused on a CCD.
Figure 6:
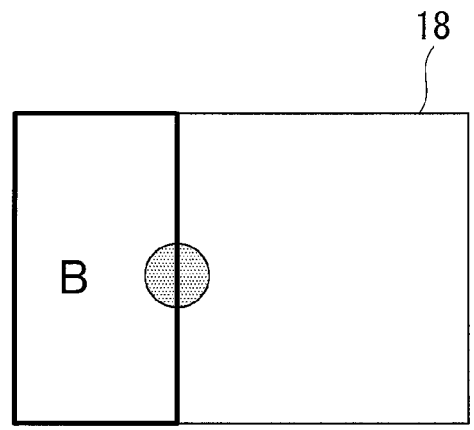
FIG. 6 is a diagram showing a minute spot focused on a CCD.

With this processing, the CCD 18 area is divided into a region A and a region B, as shown in FIGS. 5 and 6. This processing sequence is displayed on the GUI on the monitor 21.

Figure 7:
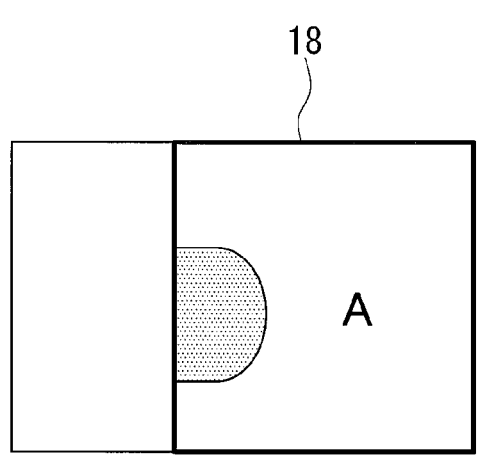
FIG. 7 is a diagram showing a minute spot focused on a CCD, illustrating a case where a microtiter plate is shifted from a focal position of an objective lens.
Figure 8:
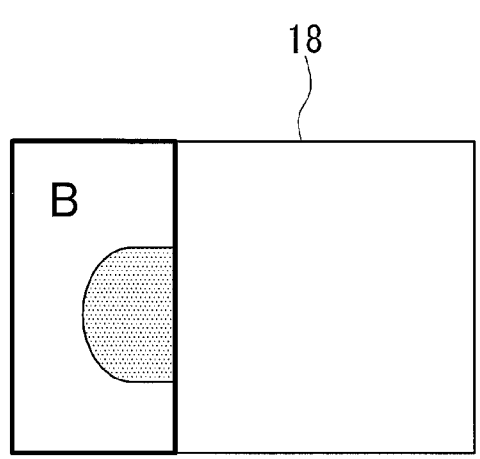
FIG. 8 is a diagram showing a minute spot focused on a CCD, illustrating a case where a microtiter plate is shifted from a focal position of the objective lens.

When the bottom surface of the microtiter plate 12 is farther than the focal position, the infrared light is radiated on the CCD 18 surface in the manner shown in FIG. 7, and when the bottom surface of the microtiter plate 12 is closer than the focal position, the infrared light is radiated on the CCD 18 surface in the manner shown in FIG. 8.

The vertical and horizontal dividing lines on the CCD 18 surface are calculated in this way, and the values thereof are written into the ROM 198 for the subsequent automatic focal-point detection; however, if the vertical and horizontal dividing lines come too close to the edges of the CCD 18 surface, the infrared light on the CCD 18 surface when the focal position is far away will fall outside the CCD 18 surface, and there is a possibility that the focal-point detection calculation will not be performed correctly.

Figure 9:
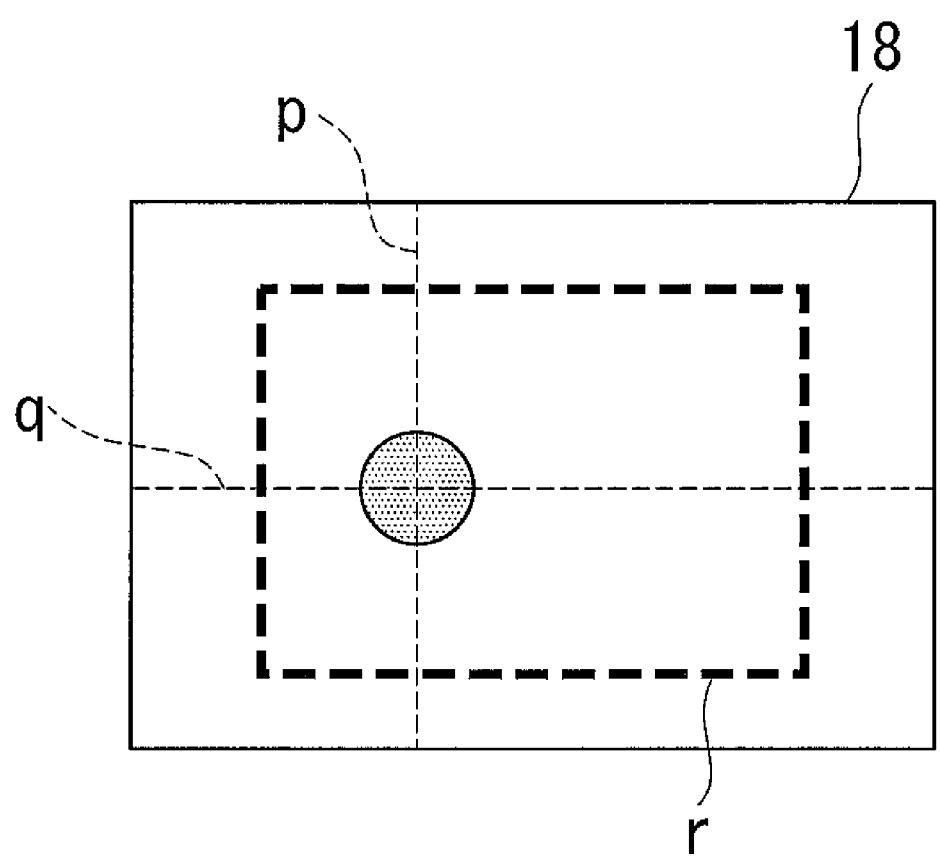
FIG. 9 is a diagram showing a minute spot focused on a CCD, illustrating a region where the minute spot should be located.

Therefore, in the manner shown in FIG. 9, when a vertical dividing line p and a horizontal dividing line q fall outside a region r that is set in advance, the adjusting program displays a message on the monitor 21 to the effect that the mechanical alignment of the CCD 18 is incorrect, to make the user realign the CCD 18. In this case, because there is a high possibility that the alignment of the CCD 18 is displaced in millimeter units, there is a possibility of processing defects or incorrect tightening of members securing the CCD 18. If the correct members are properly provided, this type of problem does not occur.

The adjustment procedure is completed with the above sequence of operations, and therefore, the person performing adjustment quits the adjustment program on the computer 20 to complete the procedure.

(2) Operation for Performing Automatic Focal-Point Detection When Observing an Object to be Detected Using the Adjusted Microscope Next, the automatic focal-point detection operation of the microscope adjusted in this way will be described. The operator turns on the power to the microscope 1, the control box 24, the computer 20, and the monitor 21 and launches a control program for the microscope 1 on the computer 20.

Next, the operator sets the microtiter plate 12 on the XY stage 11. Then, he or she moves a desired well on the microtiter plate 12 above the objective lens 2.

Next, the operator gives an instruction to commence autofocusing from the computer 20. The control box 24 outputs operation commencement instructions to each unit of the microscope 1.

The focal-point detection calculation unit 19 controls the power of the laser diode 13, and the TG 191 is activated by an instruction from the FPGA 197 to drive the CCD 18. A signal output from the CCD 18 is written into the RAM 196, and the FPGA 197 divides the data region of the RAM 196 into two regions, A and B, as shown in FIGS. 5 to 8, on the basis of the vertical dividing line p defined in the adjustment procedure described above, calculates the number of pixels in each region having a brightness value of a prescribed value or higher, and calculates A–B.

Figure 14:
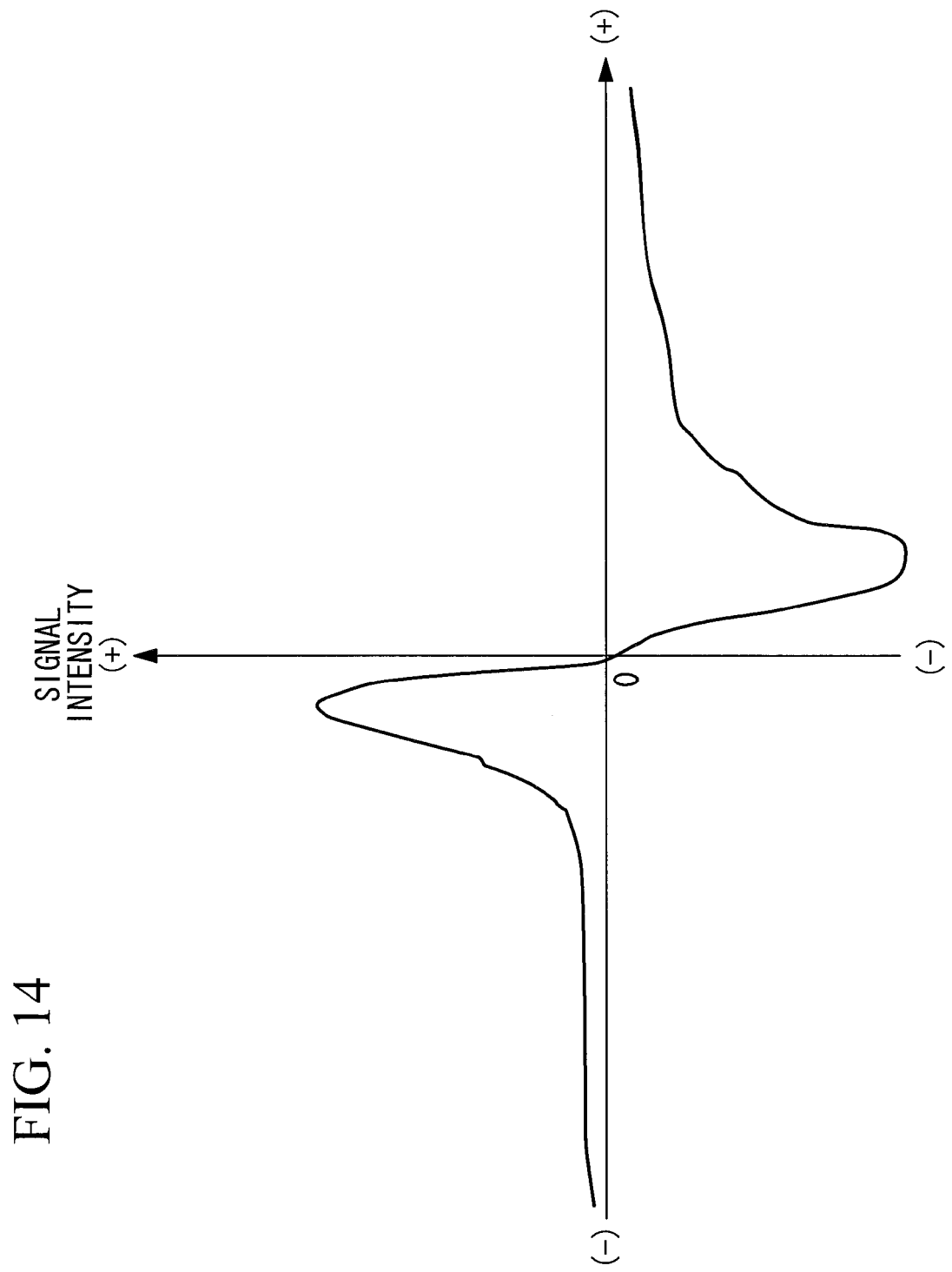
FIG. 14 is a graph showing a CCD signal intensity, indicating a focus state.

In this embodiment, the A/D converter 194 is a 12-bit converter, and the prescribed brightness value is set to 100. If this calculation is performed from a rear-focus state to an in-focus state, and then thorough the front-focus state, a graph like that shown in FIG. 14 is formed. The FPGA 197 determines the present focus state from the above calculated value and instructs the control box 24 to operate the objective lens 2 via the interface 190. The control box 24 operates a motor driver (not shown in the drawing) to operate the motor of the objective lens 2. Then, when the calculation result of the regions A and B is zero, an instruction is issued to the control box 24, via the interface 190, to stop operating the objective lens 2. The autofocus operation is performed in this way.

As described above, during adjustment, the data region of the CCD 18 is divided at the position of a minute spot, and during the automatic focal-point detection operation, the in-focus state is assessed on the basis of the brightness of the focal-point detection light in each of the divided data regions. In other words, because it is possible to assess the in-focus state of the focal-point detection light at an arbitrary position on the CCD 18 surface, it is not necessary to position the CCD 18 with extreme precision during assembly, and it is thus possible to realize automatic focal-point detection by performing suitable adjustment.

Second Embodiment

A microscope according to a second embodiment of the present invention will be described below. Structures that are the same as those of the first embodiment described above are assigned the same reference numerals, and a description thereof is omitted.

Figure 10:
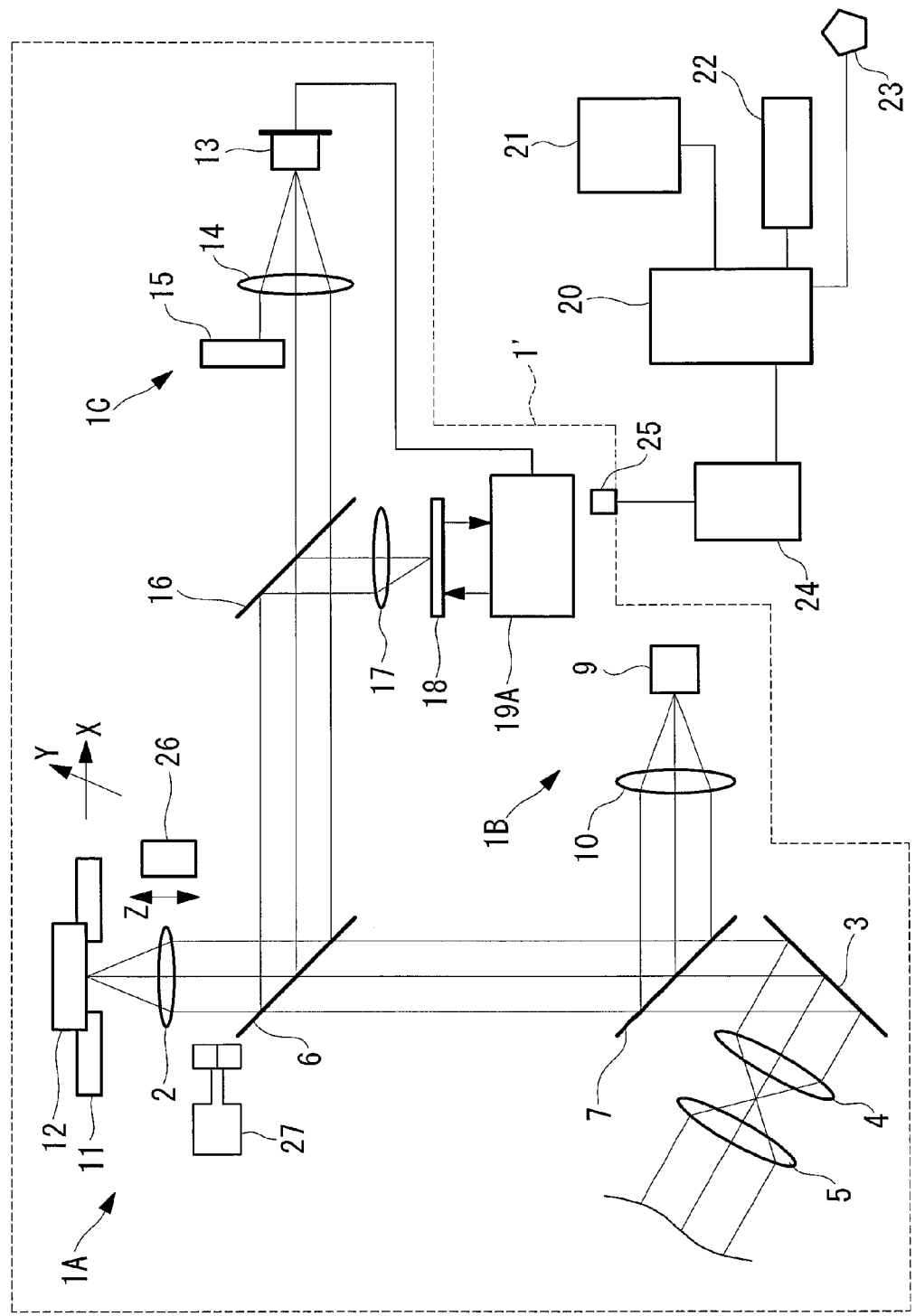
FIG. 10 is a diagram showing the configuration of a microscope according to a second embodiment of the present invention.

As shown in FIG. 10, a microscope 1' according to this embodiment includes an objective lens sensor 26 for determining the magnification of the objective lens 2 currently attached. A 4-bit signal is output from this objective lens sensor 26, and that signal is transferred to a focal-point detection calculation unit 19A and the control box 24. Reference sign 27 is a motorized objective-lens switching mechanism for switching the objective lens 2 under the control of the control box 24 when an instruction is input from the computer 20.

Figure 11:
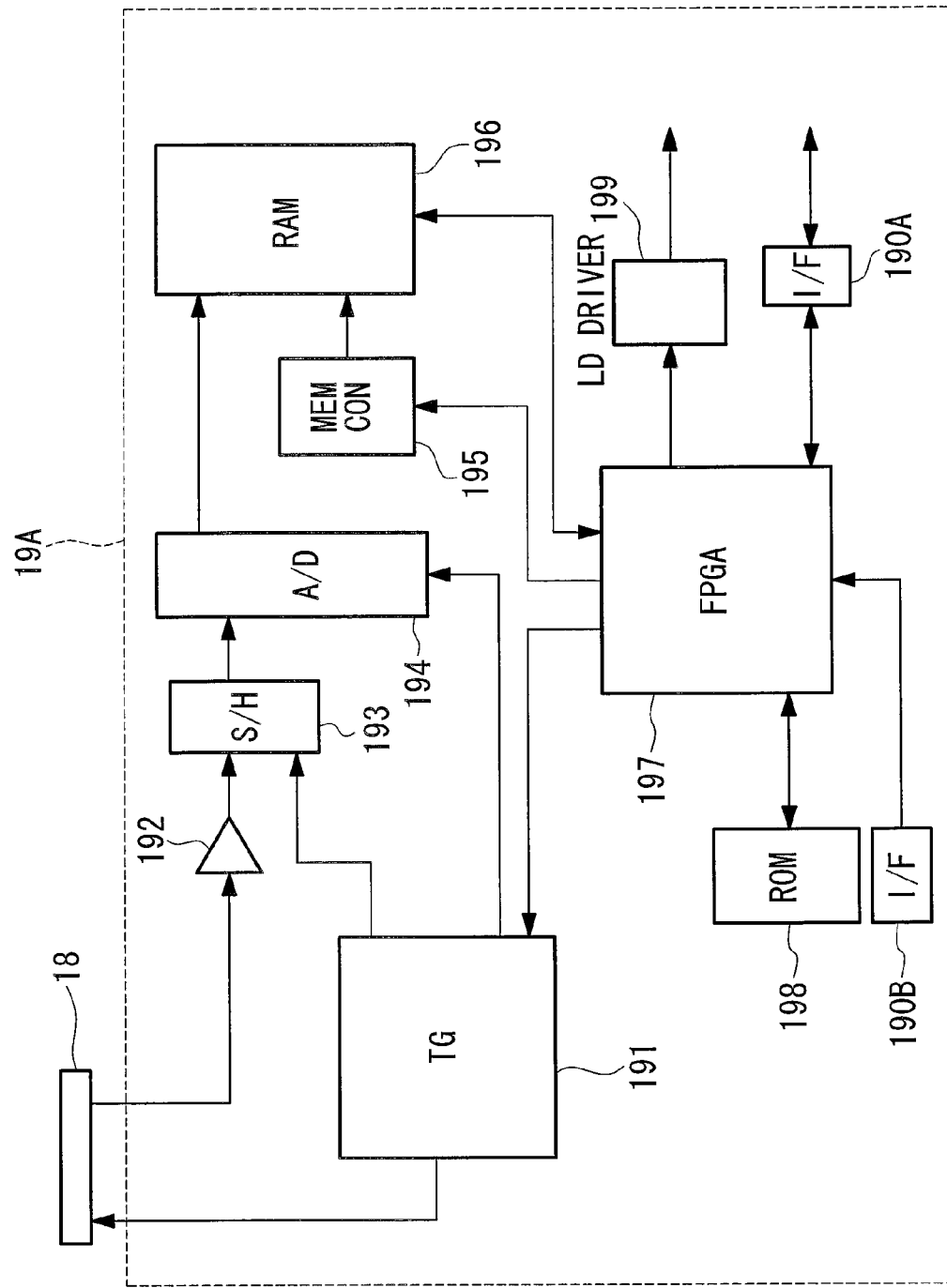
FIG. 11 is a block diagram showing a focal-point detection calculation unit of the microscope in FIG. 10.

The focal-point detection calculation unit 19A is configured as shown in FIG. 11. The focal-point detection calculation unit 19A in this embodiment includes an interface 190B for reading data of the objective lens sensor 26 into the FPGA 197.

In FIG. 10, the person performing adjustment turns on the power to the microscope 1', the control box 24, the computer 20, and the monitor 21 to initialize the system and launches an adjusting program on the computer 20. Next, he or she places the microtiter plate 12 on the XY stage 11 and operates the computer 20 to move the XY stage 11 to place a desired well of the microtiter plate 12 in the field of view of the objective lens 2. Because an optical image of the microtiter plate 12 can be observed with the eyepiece lens or the CCD camera connected to the camera port, it is possible to visually confirm the current focus state.

For the microscope 1' of this embodiment, an adjustment procedure enabling an automatic focal-point detection operation to be performed will be described next. The operation for performing the automatic focal-point detection when observing an object to be detected using the adjusted microscope is the same as that in the first embodiment, and a description thereof will be omitted.

First, the person performing adjustment operates the computer 20 to turn on the laser diode 13 and the focal-point detection calculation unit 19A. By doing so, infrared light is emitted from the laser diode 13, is reflected at the microtiter plate 12, and is focused onto the CCD 18 via the half-mirror 16 and the focusing lens 17. Because the image-acquisition area of the CCD 18 is displayed on the screen on the monitor 21, it is possible to confirm the state of the infrared light on the CCD 18.

Next, the person performing adjustment operates the computer 20 to insert the desired objective lens 2 in the light path using the motorized objective-lens switching mechanism 27, and moves the objective lens 2 up and down to focus on the bottom surface of the microtiter plate 12, in other words, in a plane on the objective lens 2 side of the bottom surface of the microtiter plate, while checking the image through the eyepiece lens or the CCD camera (not shown in the drawing). At this time, the infrared light emitted from the laser diode 13 is also focused in a plane on the objective lens 2 side of the bottom surface of the microtiter plate by the objective lens 2, and the reflected light thereof is reflected at the dichroic mirror 6 and focused as a minute spot on the CCD 18, via the half-mirror 16 and the focusing lens 17.

Figure 12:
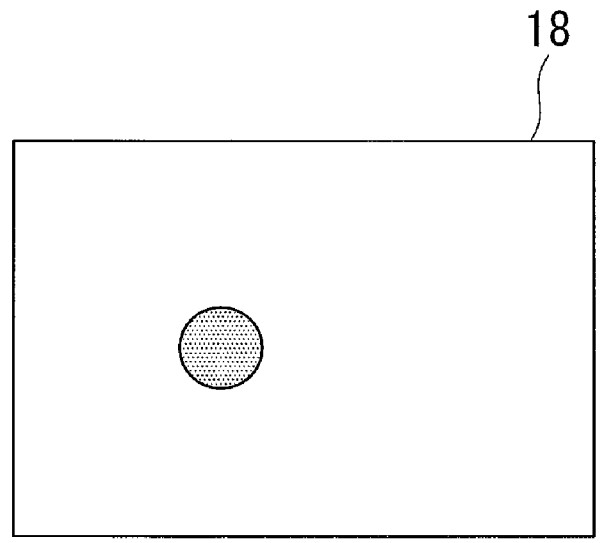
FIG. 12 is a diagram showing a minute spot focused on a CCD.
Figure 13:
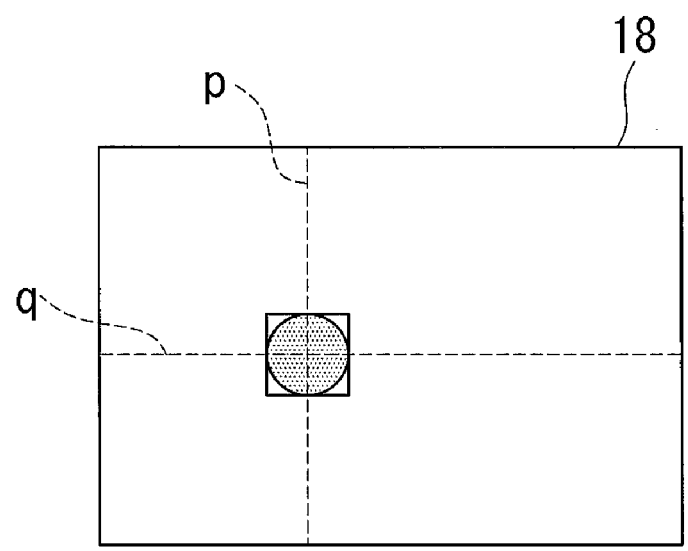
FIG. 13 is a diagram showing a minute spot focused on a CCD.

This is shown in FIG. 12. Then, the person performing adjustment issues a dividing-line detection instruction from the computer 20. By doing so, the FPGA 197 of the focal-point detection calculation unit 19A performs analysis computational processing to determine where the spot exists on the surface of the CCD 18, from the data written in the RAM 196. When the spot is identified by the FPGA 197, the FPGA 197 surrounds the spot with a rectangle, as shown in FIG. 13, and then finds the center of that rectangle and calculates vertical and horizontal dividing lines on the CCD 18 surface.

The pixel address on the CCD 18 surface for these lines is stored in the ROM 198 together with the data of the objective lens sensor 26 read from the interface 190B. The person performing adjustment performs this operation for all of the objective lenses and, for each objective lens, stores the pixel address on the CCD 18 surface in the ROM 198. The adjustment procedure is completed with the above sequence of operations, and therefore, the person performing adjustment quits the adjustment program on the computer 20 to complete the procedure.

The configuration described above affords additional advantages over those of the first embodiment; namely, it is possible to easily correct for a shift in the imaging position of the infrared spot on the CCD 18 surface caused by differences in aberrations occurring due to the magnifications of the objective lenses, thus allowing a superior autofocus operation to be performed.

The invention claimed is:

1. A microscope equipped with an automatic focusing mechanism, comprising:

an observation light source;

an objective lens for focusing first light emitted from the observation light source on an object to be detected;

an observation optical system for imaging the first light which is reflected by the object to be detected and passes through the objective lens; and a focal-point detector for detecting a positional shift of the object to be detected from a focal position of the objective lens, wherein the focal-point detector includes a focal-point detection light source for emitting focal-point detection light serving as second light, an area sensor on which is focused the focal-point detection light that is emitted from the focal-point detection light source, that is focused on the object to be detected via the objective lens, and that returns via the objective lens upon reflection at the object to be detected, and a region setting unit which can set an in-focus assessable region of the focal-point detection light acquired by the area sensor to any position on the area sensor, wherein the region setting unit includes a memory that stores photoreceptor data on the area sensor surface, and wherein the region setting unit performs analysis computations on the photoreceptor data in the memory so as to assess an in-focus state of the focal-point detection light.

2. A adjustment method for a microscope equipped with an automatic focusing mechanism according to claim 1, comprising:

positioning the object to be detected at the focal position of the objective lens; then dividing the data region of the area sensor into at least two parts centered on the focal-point detection light focused on the area sensor; assessing an in-focus state of the objective lens on the basis of a brightness value of the focal-point detection light in each divided data region during a subsequent automatic focal-point detection operation; and moving the objective lens to an in-focus position on the basis of the assessment result.

* * * * *